(12) United States Patent
Ma et al.

(10) Patent No.: US 9,536,550 B1
(45) Date of Patent: Jan. 3, 2017

(54) HEALTH CHECK FOR READ/WRITE HEAD

(71) Applicant: Seagate Technology LLC, Cupertino, CA (US)

(72) Inventors: Minjie Ma, Bloomington, MN (US); Edmun Seng, Singapore (SG); Tim Rausch, Farmington, MN (US); Edward Charles Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/945,715

(22) Filed: Nov. 19, 2015

(51) Int. Cl.
| | | |
|---|---|---|
| G11B 27/36 | (2006.01) | |
| G11B 5/09 | (2006.01) | |
| G11B 5/455 | (2006.01) | |
| G11B 5/00 | (2006.01) | |

(52) U.S. Cl.
CPC ....... G11B 5/455 (2013.01); *G11B 2005/0021* (2013.01)

(58) Field of Classification Search
CPC ..... G11B 27/36; G11B 5/012; G11B 2220/20; G11B 2220/90; G11B 5/09; G11B 5/6005; G11B 5/59633; G11B 5/58; G11B 5/584
USPC .............................. 360/31, 39, 53, 77.01, 75
See application file for complete search history.

(56) References Cited

U.S. PATENT DOCUMENTS

| | | | |
|---|---|---|---|
| 6,249,392 B1 | 6/2001 | Sacks et al. | |
| 7,119,537 B2 | 10/2006 | Che et al. | |
| 7,633,694 B2 | 12/2009 | Alex et al. | |
| 7,848,037 B2 * | 12/2010 | Deng ................ | G01R 33/09 |
| | | | 324/212 |
| 8,138,754 B2 | 3/2012 | Ogawa et al. | |
| 8,179,624 B2 | 5/2012 | Inomata | |
| 8,614,934 B1 | 12/2013 | Tomikawa et al. | |
| 8,625,224 B1 | 1/2014 | Lin et al. | |
| 8,854,929 B1 | 10/2014 | Champion et al. | |
| 8,929,186 B1 | 1/2015 | Sharma et al. | |

OTHER PUBLICATIONS

U.S. Appl. No. 14/716,171, filed May 19, 2015, Mader et al.

\* cited by examiner

*Primary Examiner* — Nabil Hindi
(74) *Attorney, Agent, or Firm* — Hollingsworth Davis, LLC

(57) ABSTRACT

A cross-track profile of a known good test track on a recording medium is read during operation of a data storage device. Two or more center locations of the test track are determined at two or more different amplitude levels via a read transducer. A health condition of the read transducer is determined by comparing the two or more center locations of the test track with one another.

20 Claims, 12 Drawing Sheets

HEALTH CHECK FOR READ/WRITE HEAD

SUMMARY

The present disclosure is directed to a health check for a magnetic recording read/write head, such as a heat-assisted magnetic recording read/write head. In one embodiment, a cross-track profile of a known good test track on a recording medium is read during operation of a data storage device. Two or more center locations of the test track are determined at two or more different amplitude levels via a read transducer. A health condition of the read transducer is determined by comparing the two or more center locations of the test track with one another.

In another embodiment, during operation of a data storage device that comprises a recording medium, a health condition of a read transducer that reads from the recording medium is determined. In response to the health condition of the read transducer satisfying a threshold, a new test track is written on the recording medium via a write transducer associated with the read transducer. Two or more center locations of the new track are determined at two or more different amplitude levels via the read transducer. A health condition of the write transducer is determined by comparing the two or more center locations of the new track with one another.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
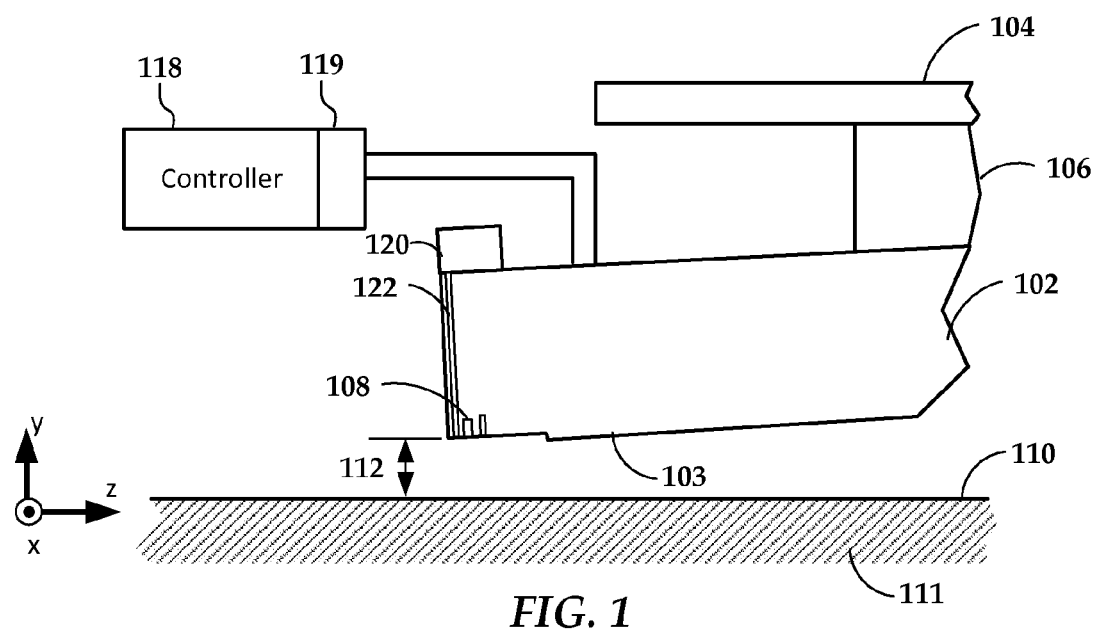
FIG. 1 is a block diagram of a hard drive slider and media arrangement according to an example embodiment.

The present disclosure generally relates to data storage devices such as conventional magnetic recording (CMR) and those utilizing heat-assisted magnetic recording (HAMR), also referred to as energy-assisted magnetic recording (EAMR), thermally-assisted magnetic recording (TAMR), and thermally-assisted recording (TAR). The read transducer and reading process in CMR and HAMR are similar, e.g., utilizing a magnetoresistive sensor. The writing process in HAMR is different from that of CMR. A HAMR head uses an energy source such as a laser to create a small hotspot on a magnetic disk during recording. The heat lowers magnetic coercivity at the hotspot, allowing a write transducer to set the magnetic orientation of the grains in the hotspot, after which the hotspot is allowed to rapidly cool. Due to the relatively high coercivity of the medium after cooling, the data is less susceptible to data errors due to thermally-induced, random fluctuation of magnetic orientation known as the paramagnetic effect. This allows data to be reliably written to a smaller area on a HAMR medium than would be possible using a recording medium with lower coercivity.

In HAMR, a laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

Generally, the NFT is formed by depositing thin-film of material such as gold, silver, copper, etc., a region near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium and generates heat.

Due to the intensity of the laser light and the small size of the NFT, the NFT and its surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. The degradation of the NFT will affect the effective service life of a HAMR read/write head and thus that of the corresponding data storage device.

As the NFT degrades, the overall writing efficiency can change (e.g., less or more optical energy emitted for the same level of laser power), which can affect the written track width and the quality of the recording. This can affect bit error rate (BER), as well as change the location of the written track center relative to the track center defined by the servo system. This latter effect is sometimes referred to as reader-to-writer offset (RWO) change.

The reader of a HAMR read/write head may also be subject to degradation over time. While a HAMR reader may be similar to a conventional reader (e.g., a magnetoresistive transducer), a smaller area of recorded bits will be covered. As such, changes to the CMR or HAMR reader's response may affect sensitivity of the reader, and cause errors when reading back the data. In view of this, methods and apparatuses are described herein to monitor the health of a CMR or a HAMR read/write head and perform appropriate remediation.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating. A heater (not shown) may be located near the media-facing surface 110 to actively adjust the flying height 112. Such a heater causes localized thermal expansion near the read/write transducers.

A controller 118 is coupled to the read/write transducers 108, as well as other components of the read/write head 102, such as heaters, sensors, etc. The controller 118 may be part of general- or special-purpose logic circuitry that controls the functions of a data storage device (e.g., hard disk drive, hybrid drive) that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 and are near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
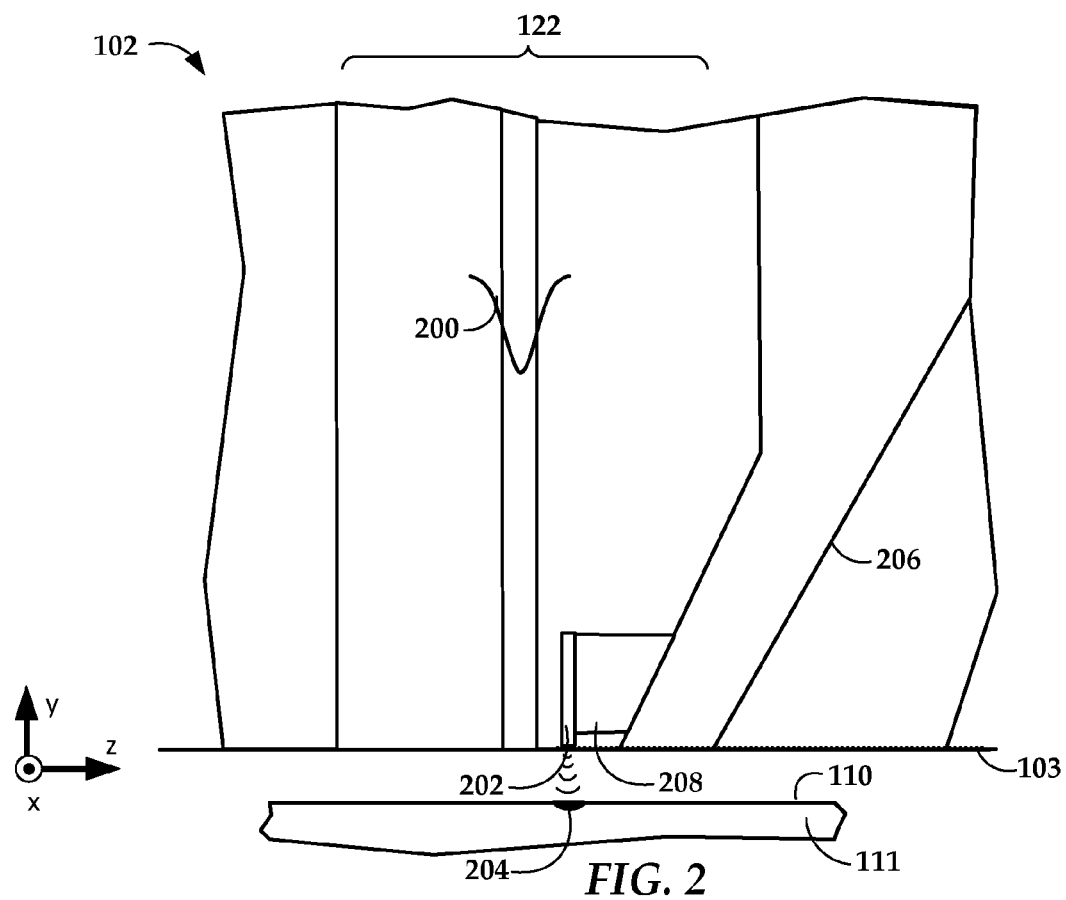
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 (which is part of the read/write transducer 108 shown in FIG. 1) emits magnetic flux near the media-facing surface 103 in response to an applied current. Flux from the write pole 206 sets the magnetic orientation of the hotspot 204 as it moves under the write pole 206 in the downtrack direction (z-direction).

The energy 200 applied to the near-field transducer 202 creating the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time.

As the NFT degrades, the overall writing efficiency changes (e.g. reduced or increased optical output for the same laser power input), which can affect the written track width. The changes in track width can result in changes in bit-error-rate (BER). Degradation of the NFT can also change the location of the written track center relative to the servo-defined center location, the aforementioned RWO change. Accordingly, methods and apparatuses described herein monitor the health of the head and identify when re-optimization is needed and/or when the host system should be notified.

Figure 3A:
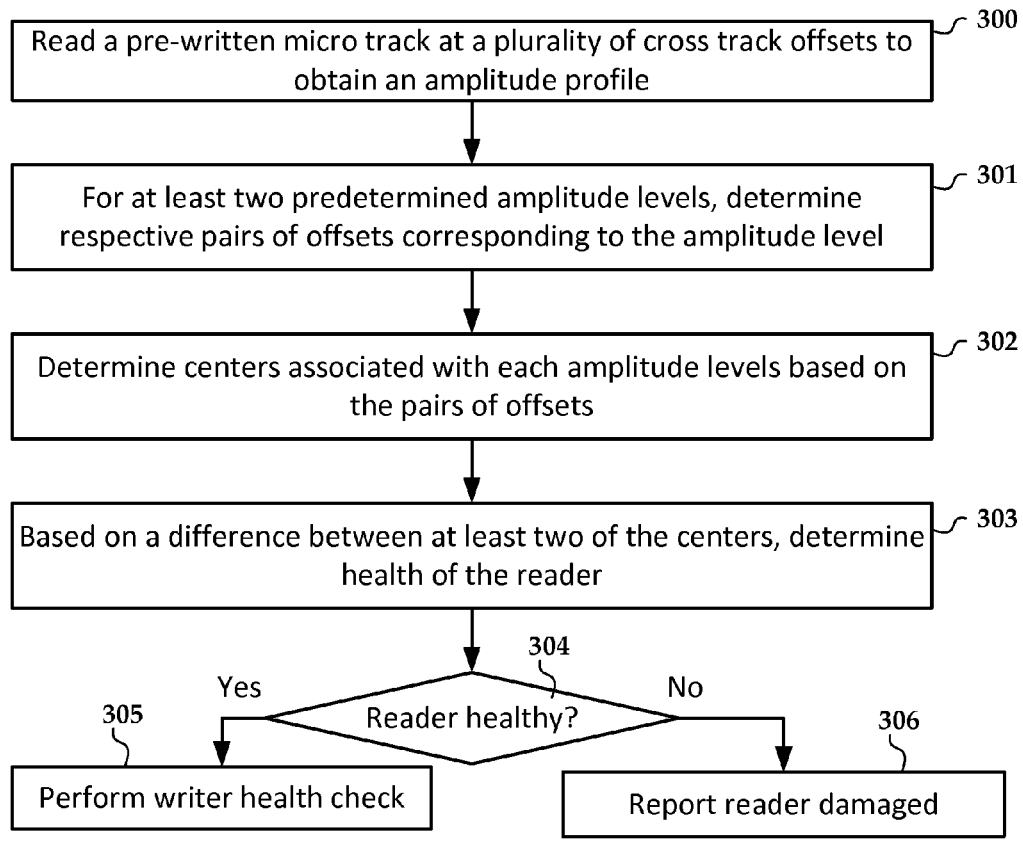
FIGS. 3A-3D and 4A-4B are flowcharts illustrating methods according to example embodiments.

In FIGS. 3A-C and 4, flowcharts show a head health check procedure according to an example embodiment. In FIG. 3A, the amplitudes of a pre-written microtrack is read 300 at a plurality of cross track offsets to obtain an amplitude profile. This is sometimes referred to as a "cross-track scan." The profile may be measured multiple times and the results averaged. A microtrack is a test track that may be written during manufacture (although may also be written in a fielded device). Writing a microtrack generally involves writing a track with a conventional track width (e.g., corresponding to a width of a track written by the storage device's read/write heads) at a specific radius of the disc via a write head. The write head is then shifted to either side of the written track and an erase current is applied, leaving a narrow strip of the written track. A microtrack is a known good track that can be used to measure the reader width or to find the defects in a read element of a head. In other variations, a known good test track may be written via the writer after it has been determined the writer is known to be properly functioning. This test track may be a standard-width track or narrowed in a similar way as a microtrack, e.g., partial erasure on either side of the track.

For at least two predetermined amplitude level, the servo offset is determined 301 corresponding to each amplitude level. For the purposes of illustration, the examples shown below (see, e.g., FIGS. 5-7) utilize three amplitude levels, 10%, 50% and 90% of maximum track amplitude. The pairs of offsets are servo readings generally to the left and right of track center level, although for some type of defects, both offsets of the pair may be on one side of the track center. The pairs of servo offsets are combined (e.g., summed, averaged) to determine 302 centers associated with the respective amplitude levels. Based on a difference between at least two of the centers, a health of the reader is determined 303.

A decision is made at block 304 based on whether the reader is healthy. Examples of how this determination 304 is made will be described in greater detail below. If the reader is healthy, then a writer health check is performed 305, which will be described in reference to FIG. 4. If the reader is not healthy, then the reader may be reported 306 as damaged, e.g., via a Self-Monitoring, Analysis and Reporting Technology (SMART) message sent to the host. The procedure shown in FIG. 3A may be performed for each read transducer of the data storage device.

Figure 3B:
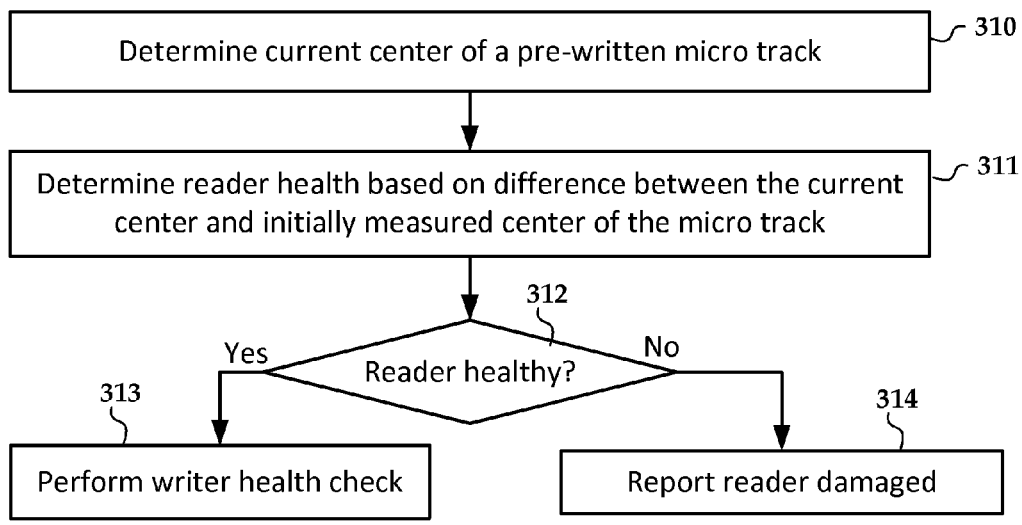
Figure 3C:
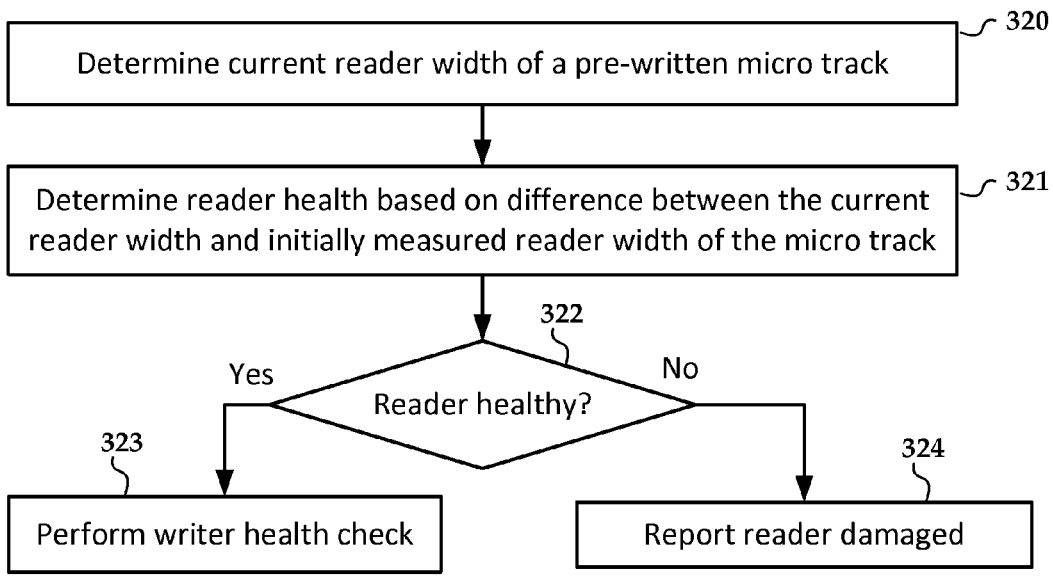
Figure 3D:
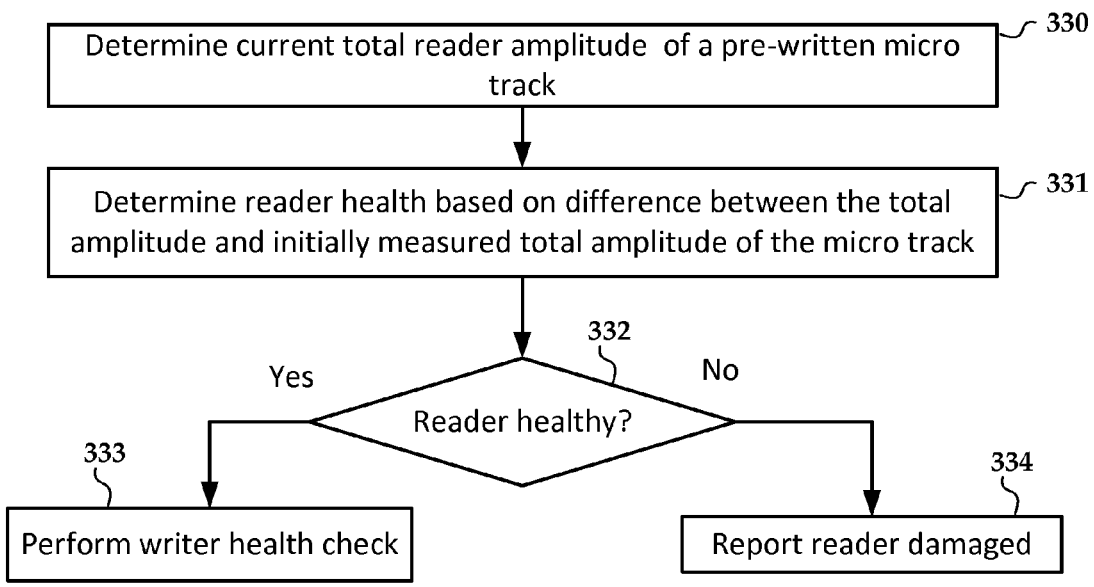

In FIGS. 3B-3D, three additional reader checks are described according to example embodiments. The reader checks in FIGS. 3A-3D can be used together in any combination to determine reader health. In FIG. 3B, a current track center of a pre-written microtrack is measured 310. Based on a difference between the current microtrack center and an initial microtrack center, reader health may be determined 311. The initial track center is a previously measured center of the same microtrack at a known good state, e.g., from factory qualification testing. The initial and current centers may be measured using data obtained from a cross-track amplitude scan such as performed at block 300 in FIG. 3A. For example, the average servo location of two measurements at 50% amplitude may be used as a track center. Other measures of the track center may also or instead be used, e.g., region of maximum amplitude, point on the amplitude profile with zero slope, average of all points in the profile, etc. Similar to the procedure in FIG. 3A, the reader health determined at block 312 is used to either continue to a writer health check 313 if the reader is good; otherwise reader damage is reported 314.

In FIG. 3C, a current reader width is determined 320 using a pre-written microtrack. Based on a difference between the current reader width and an initial reader width determined from the same microtrack, reader health may be determined 321. The initial reader width is a previously measured width at a known good state, e.g., from factory qualification testing. The initial and current reader widths may be measured using data obtained from a cross-track amplitude scan such as performed at block 300 in FIG. 3A. For example, the track width at 50% amplitude level may be used as reader width. Similar to the procedure in FIG. 3A, the reader health determined at block 322 is used to either continue to a writer health check 323 if the reader is good; otherwise reader damage is reported 324.

In FIG. 3D, a current total reader amplitude is determined 330 using a pre-written microtrack. Based on a difference between the current total amplitude and an initial total amplitude determined from the same microtrack, reader health may be determined 321. The initial reader total amplitude is a previously measured width at a known good state, e.g., from factory qualification testing. The initial and current reader total amplitudes may be measured using data obtained from a cross-track amplitude scan such as performed at block 300 in FIG. 3A. For example, the total amplitude may be a peak amplitude. In other example, the total amplitude may be an integral of the cross track profile over some range, e.g., between 10% amplitude points to the left and right of track center. Similar to the procedure in FIG. 3A, the reader health determined at block 332 is used to either continue to a writer health check 333 if the reader is good; otherwise reader damage is reported 334.

Figure 4A:
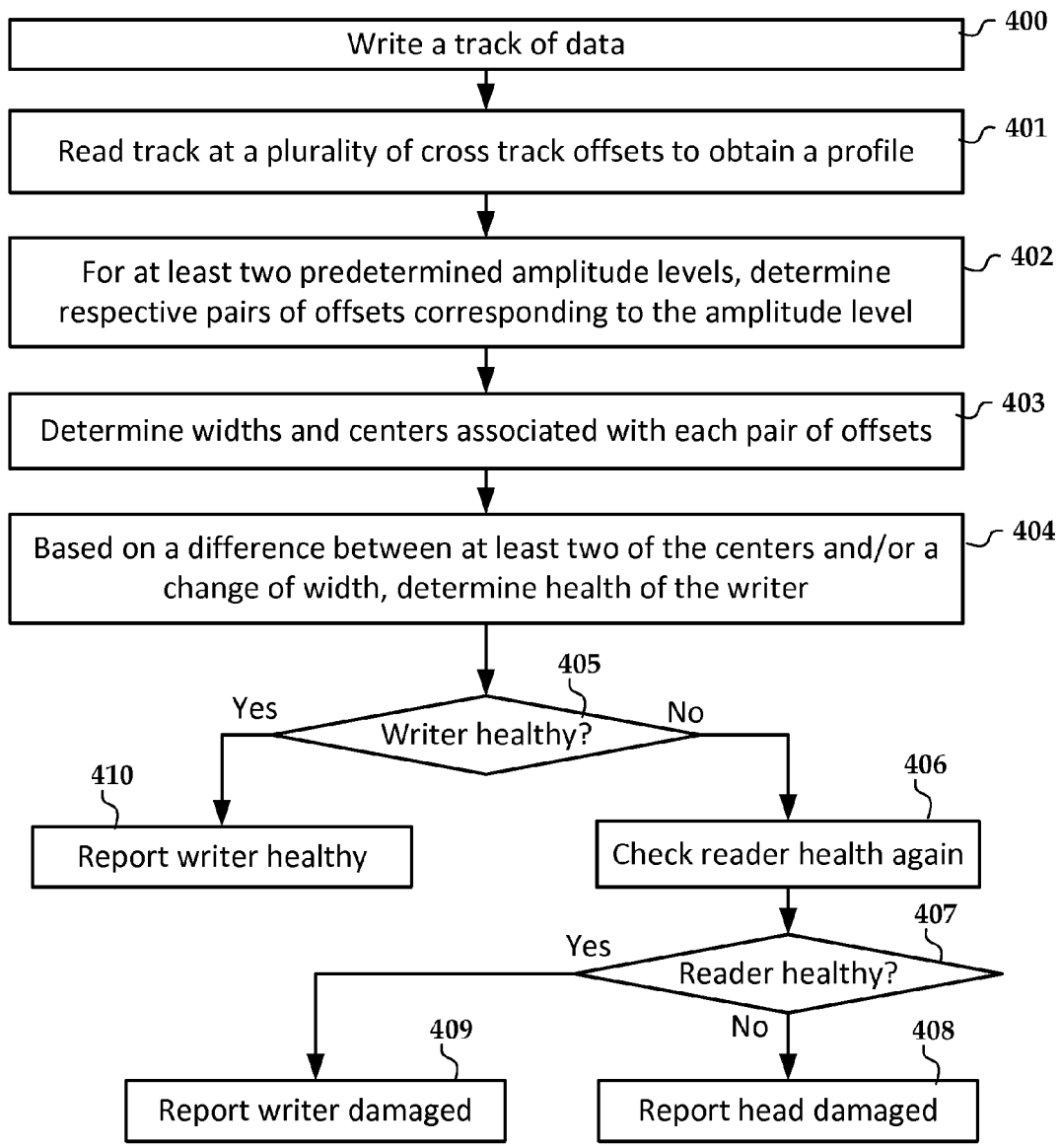
Figure 4B:
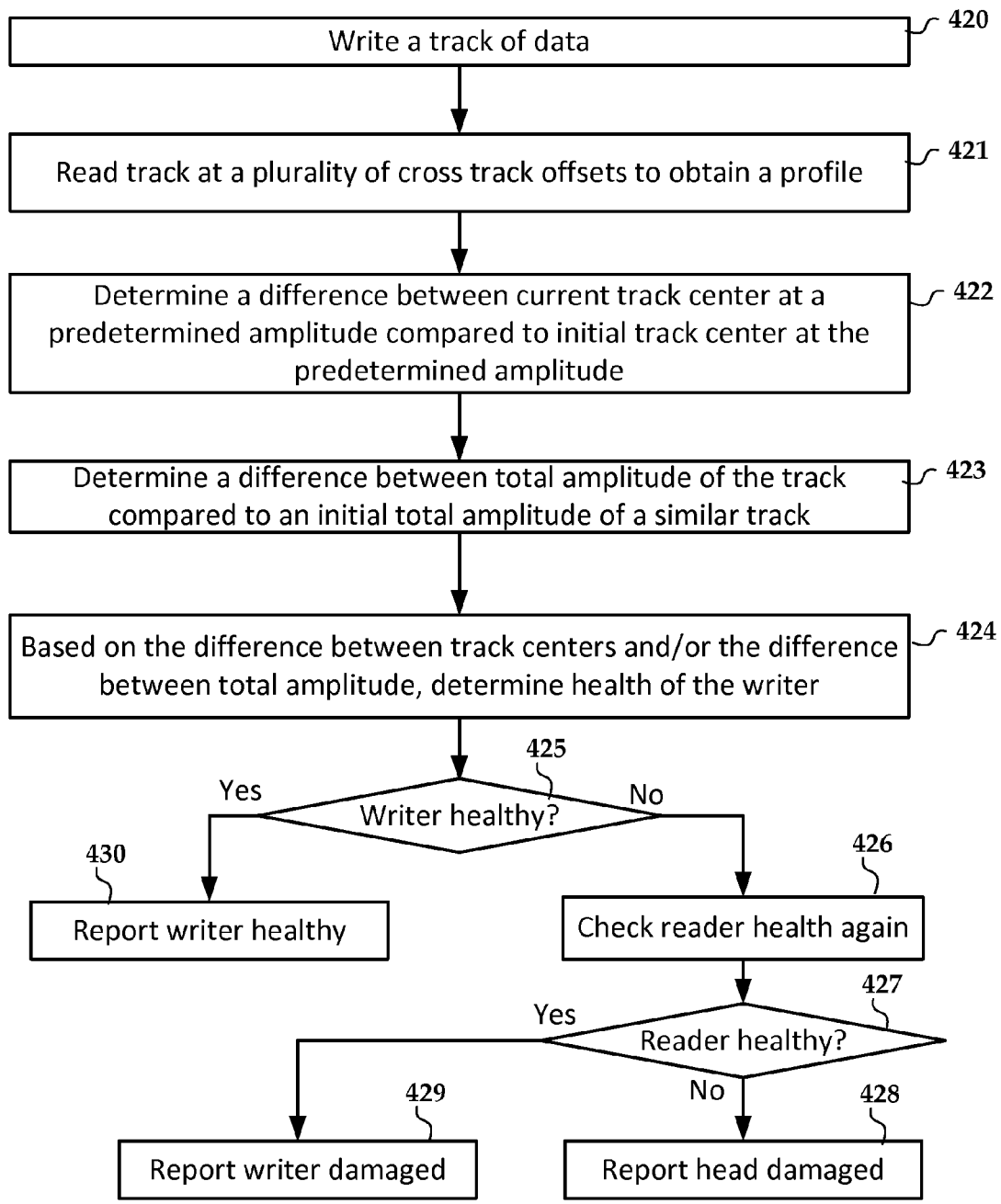

After determining the reader is healthy using any or all of the above-described procedures, a writer health check is performed as shown in FIGS. 4A-4B. Any combination of the procedures in 4A-4B can be used to determine writer health. In FIG. 4A, a test track is written 400. For example, the writing 400 of the test track may involve AC erasing a region encompassing at least three adjacent tracks with a 1T pattern, and then writing a 2T pattern along a center one of the track. An amplitude of this written track is read 401 at a plurality of cross track offsets to obtain a cross-track amplitude profile.

As with the reader, for at least two predetermined amplitude levels, pairs of servo offsets are determined 402 corresponding to each amplitude level of the test track. The same three amplitude levels used in the reader test may be used, e.g., 10%, 50% and 90% of maximum track amplitude. The pairs of offsets are combined (e.g., summed, averaged) to determine 403 centers associated with the respective amplitude levels, as well as widths corresponding to the amplitude level. Based on a difference between at least two of the centers, and/or a change in the writer width compared to an initially measured width (e.g., width at 50% amplitude), a health of the writer is determined 404. In some embodiments, only the width or centers are determined at block 403, in which case block 404 may use just the respective width or centers to determine health.

A decision is made at block 405 based on whether the writer is healthy. Examples of how this determination 405 is made will be described in greater detail below. If the writer is healthy, then the head is reported 410 as healthy. If the writer is not healthy, then the reader health may be checked again 406, e.g., as described in FIGS. 3A-3D. If the reader is healthy as determined at block 407, then the writer is reported damaged 409 (e.g., using a SMART status message); otherwise the head is reported 408 as damaged. The procedure shown in FIG. 4A may be performed for each write transducer of the data storage device.

In FIG. 4B, a graph illustrates a writer check that may be performed instead of or in addition to that shown in FIG. 4A. A test track is written 420, and may be the same track written at step 400 if the processes in FIGS. 4A and 4B are performed together. Otherwise the track written at block 410 may be a new track written similarly as described in regards to FIG. 4A. Amplitudes of the written track are read 421 at a plurality of cross track offsets to obtain a cross-track amplitude profile.

At block 422, a difference between a current track center at a predetermined amplitude (e.g., 50%) compared to initial track center at the predetermined amplitude is determined. A difference between total amplitude of the track compared to an initial total amplitude of a similar track is also determined 423. Based on the differences determined at 422-423, a health of the writer is determined 424. In some embodiments, only one of the differences determined at blocks 422 and 423 may be measured, in which case the determination at block 424 may use only one of the differences.

A decision is made at block 425 based on whether the writer is healthy. Examples of how this determination 425 is made will be described in greater detail below. If the writer is healthy, then the head may be reported 430 as healthy. If the writer is not healthy, then the reader health may be checked again 426, e.g., as described in FIGS. 3A-3D. If the reader is healthy as determined at block 427, then the writer is reported damaged 429 (e.g., using a SMART status message); otherwise the head is reported 428 as damaged. The procedure shown in FIG. 4B may be performed for each write transducer of the data storage device.

Figure 5:
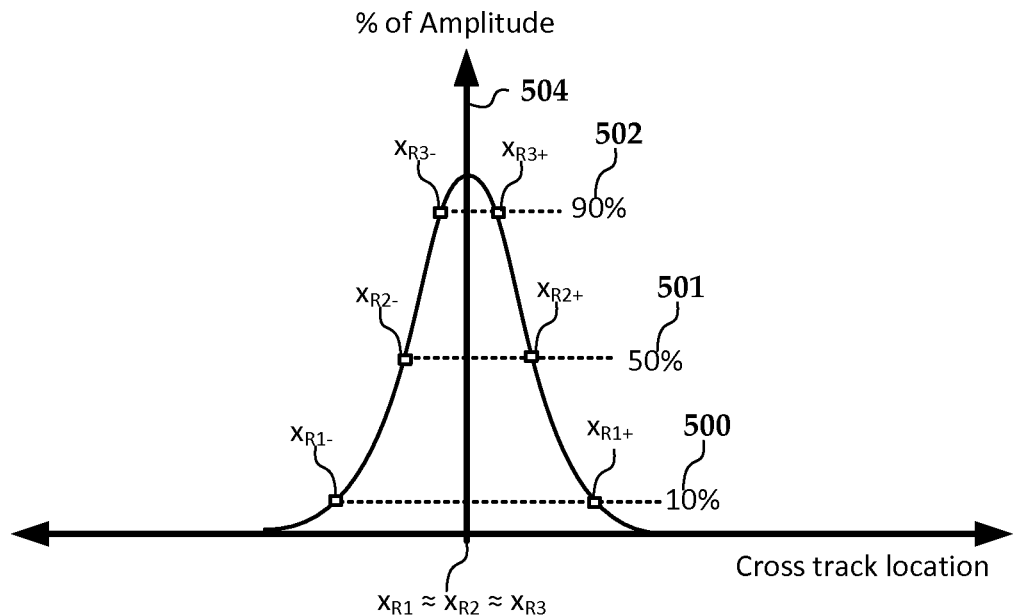
FIGS. 5 and 6 are graphs illustrating cross-track profiles used to evaluate a read transducer according to example embodiments.
Figure 6:
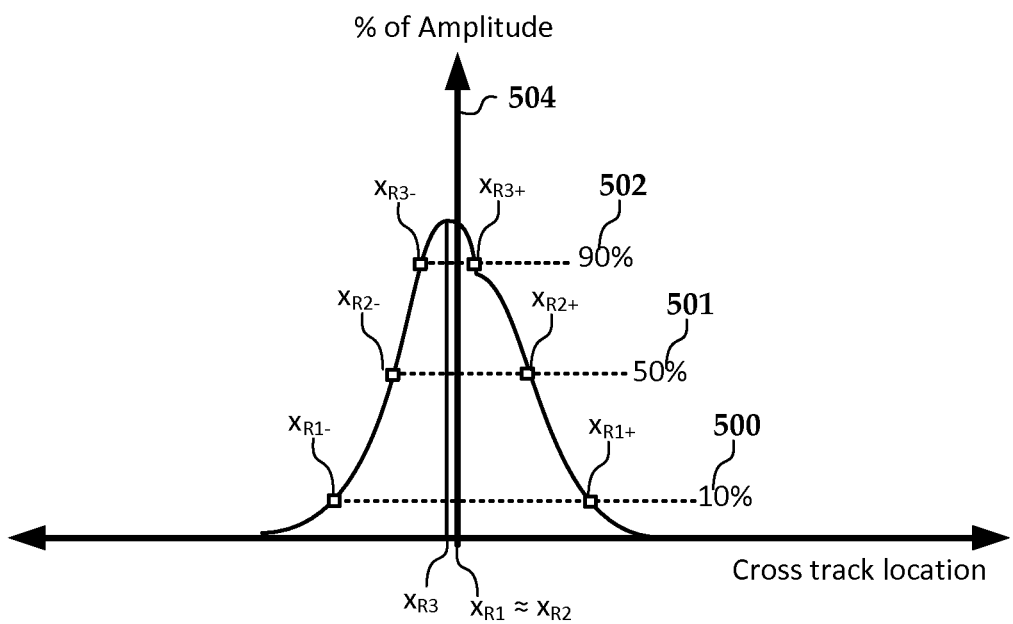

In reference now to FIGS. 5 and 6, graphs illustrate how a cross-track profile of a microtrack may be analyzed to determine head health. As seen in FIG. 5, the cross track profile of a known good test track (e.g., microtrack) is analyzed at three predetermined amplitude levels 500-502 (corresponding to 10%, 50%, and 90%, respectively). For each of the amplitudes 500-502 pairs of offsets are determined. For example, offset pair $x_{R1-}$ and $x_{R1+}$ are associated with amplitude level 500, with the "+" and "−" subscripts indicating offsets that are negative or positive relative to one another. It will be understood that this does not mean that the offsets themselves will always be on one side or the other of the track center, which is indicated by vertical axis 504. For example, an extreme distortion of the curve near the top may result in both $x_{R1-}$ and $x_{R1+}$ being on one side or the other of the axis 504. Although the offsets are shown as a pair of points on the curve, the points themselves may be determined based on multiple measurements, e.g., average of repeated measurements at the same amplitude, interpolation of the curve based on nearby points, etc.

The offset pairs are combined (e.g., averaged, summed) to determine centers $x_{R1}$, $x_{R2}$, $x_{R3}$ associated with the respective amplitude levels 500-502, e.g., $x_{R1}=(x_{R1-}+x_{R1+})/2$ and so on. The curve in FIG. 5 is intended to represent the response of a healthy reader, such that the centers $x_{R1}$, $x_{R2}$, $x_{R3}$ are substantially aligned along the track center. The width at three amplitude level may be determined by calculating delta values $\Delta_{R21}=x_{R2}-x_{R1}$, $\Delta_{R32}=x_{R3}-x_{R2}$, $\Delta_{R31}=x_{R3}-x_{R1}$. For a healthy reader, as shown in FIG. 5, $x_{R1}\approx x_{R2}\approx x_{R3}$, which may be expressed as $|x_{R1}-x_{R2}|<\Delta$, $|x_{R2}-x_{R3}|<\Delta$, and $|x_{R1}-x_{R3}|<\Delta$, where $\Delta$ is user defined. In contrast, for a damaged reader as shown in FIG. 6, the center $x_{R3}$ is misaligned with centers $x_{R1}$ and $x_{R2}$, such that at least one of the following conditions will be true: $|x_{R1}-x_{R2}|>\Delta$, $|x_{R2}-x_{R3}|>\Delta$, and $|x_{R1}-x_{R3}|>\Delta$.

For the writer health check as described in FIG. 4, a test track is written and a similar measurement as shown in FIG. 5 is made on the test track. For the writer health check, the notation $x_{W1}$, $x_{W2}$ and $x_{W3}$ would be used for the three center locations corresponding to the three amplitudes 500-502 (although the writer test may use different amplitudes than the reader). As with the reader test, the centers of the writer test can be compared as follows: $\Delta_{W21}=x_{W2}-x_{W1}$, $\Delta_{W32}=x_{W3}-x_{W2}$, $\Delta_{W31}=x_{W3}-x_{W1}$. For a healthy writer, $x_{W1}\approx x_{W2}=x_{W3}$, which may be expressed as $|x_{W1}-x_{W2}|<\Delta$, $|x_{W2}-x_{W3}|<\Delta$, and $|x_{W1}-x_{W3}|<\Delta$, where $\Delta$ is user defined. For a damaged writer, at least one of the following will be true: $|x_{W1}-x_{W2}|>\Delta$, $|x_{W2}-x_{W3}|>\Delta$, and $|x_{W1}-x_{W3}|>\Delta$. This may be similar to the condition shown in the graph in FIG. 6, except that, because the reader has been tested and assumed good, the shape of the curve would be due to a defect in the writer and not the reader.

Figure 7:
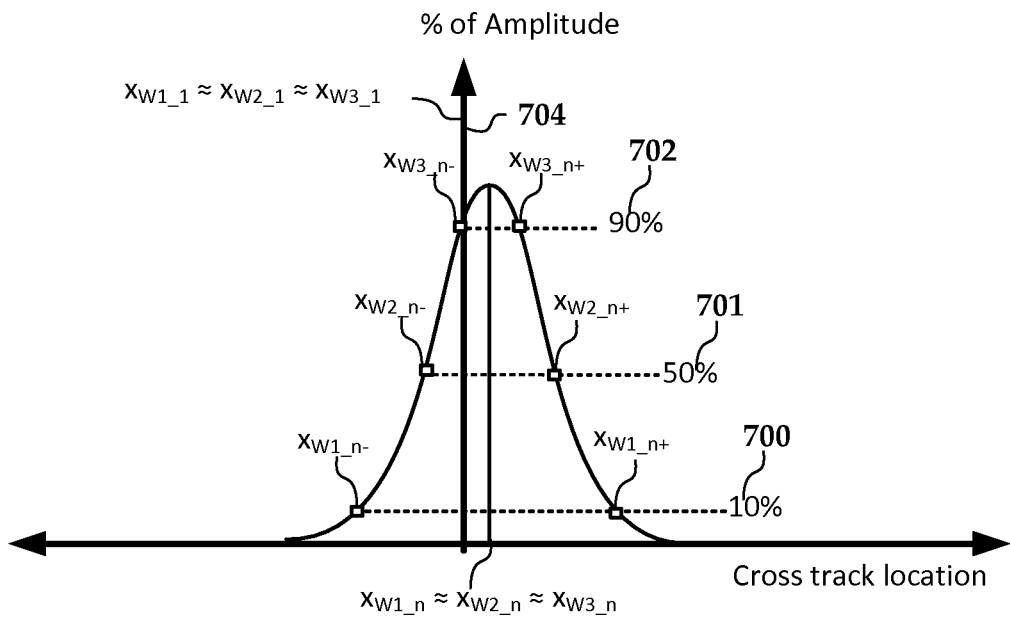
FIGS. 7 and 8 are graphs illustrating cross-track profiles used to evaluate a write transducer according to example embodiments.
Figure 8:
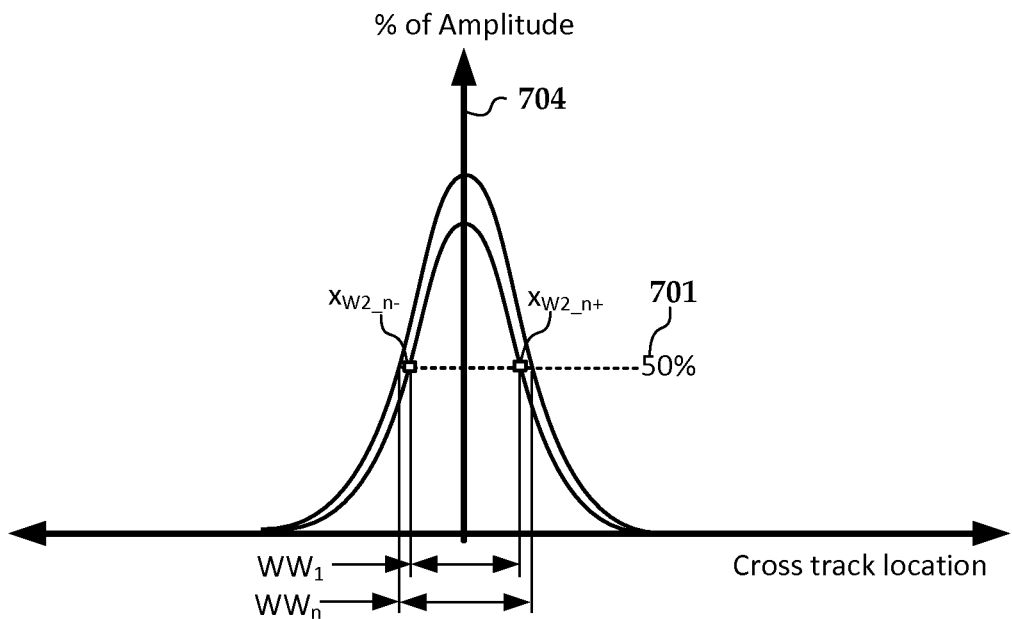

In FIGS. 7 and 8, graphs illustrate additional test results that may indicate a changed or failed reader and/or writer. For purposes of this example, the writer is tested at the amplitudes 700-702 that are the same as previously shown amplitudes 500-502, although different amplitudes may be used. The illustrated curve represents the $n^{th}$ written track used for testing the writer. The results of a cross-track scan of the currently written track results in centers $x_{W1\_n}$, $x_{W2\_n}$, $x_{W3\_n}$, which may be different from the respective baseline results $x_{W1\_1}$, $x_{W2\_1}$, $x_{W3\_1}$. The baseline results may have been measured from a first-written test track, e.g., during certification testing. A writer failure may be reported if at least one of the following is true: $|x_{W1\_n}-x_{W1\_1}|>\Delta$, $|x_{W2\_n}-x_{W2\_1}|>\Delta$, or $|x_{W3\_n}-x_{W3\_1}|>\Delta$. Generally, this may indicate a change in reader writer offset (RWO). While this condition may be represented a failure for the purposes of this procedure, a detected RWO condition may be correctable during operation of the device, e.g., by adjusting servo settings to compensate for the RWO. A similar test may be performed for the reader by reading a cross-track profile of a microtrack. In such a case, the current center is compared to an initially measured center of the microtrack, e.g., one that was measured during certification testing.

In FIG. 8, a graph illustrates a condition where read or write width changes, which may also indicate a failure of a reader and/or writer. By convention, the read or write width may be defined as the full width at half maximum (FWHM) which corresponds to 50% amplitude level 701, although other amplitude levels may be used. For testing the reader, a test track is written and two points $X_{W2\_n-}$ and $X_{W2\_n+}$ are measured at this amplitude, and combined (e.g., subtracted) to determine a width $WW_n$. This width is compared to a previously measured width at the same amplitude, shown here as $WW_1$. For example, a baseline value previously written and measured (e.g., during certification testing) may be used as reference width $WW_1$. Generally, a change in width that exceeds some value (e.g., $|WW_1-WW_n|>\Delta_W$) may indicate a change in the writer that might be considered a failure condition. As with RWO, this condition may be correctable in operation, e.g., changing laser activation power to compensate. A similar test may be performed for the reader by reading a cross-track profile of a microtrack. In such a case, the current width is compared to an initially measured width of a microtrack, e.g., one that was measured during certification testing.

Figure 9A:
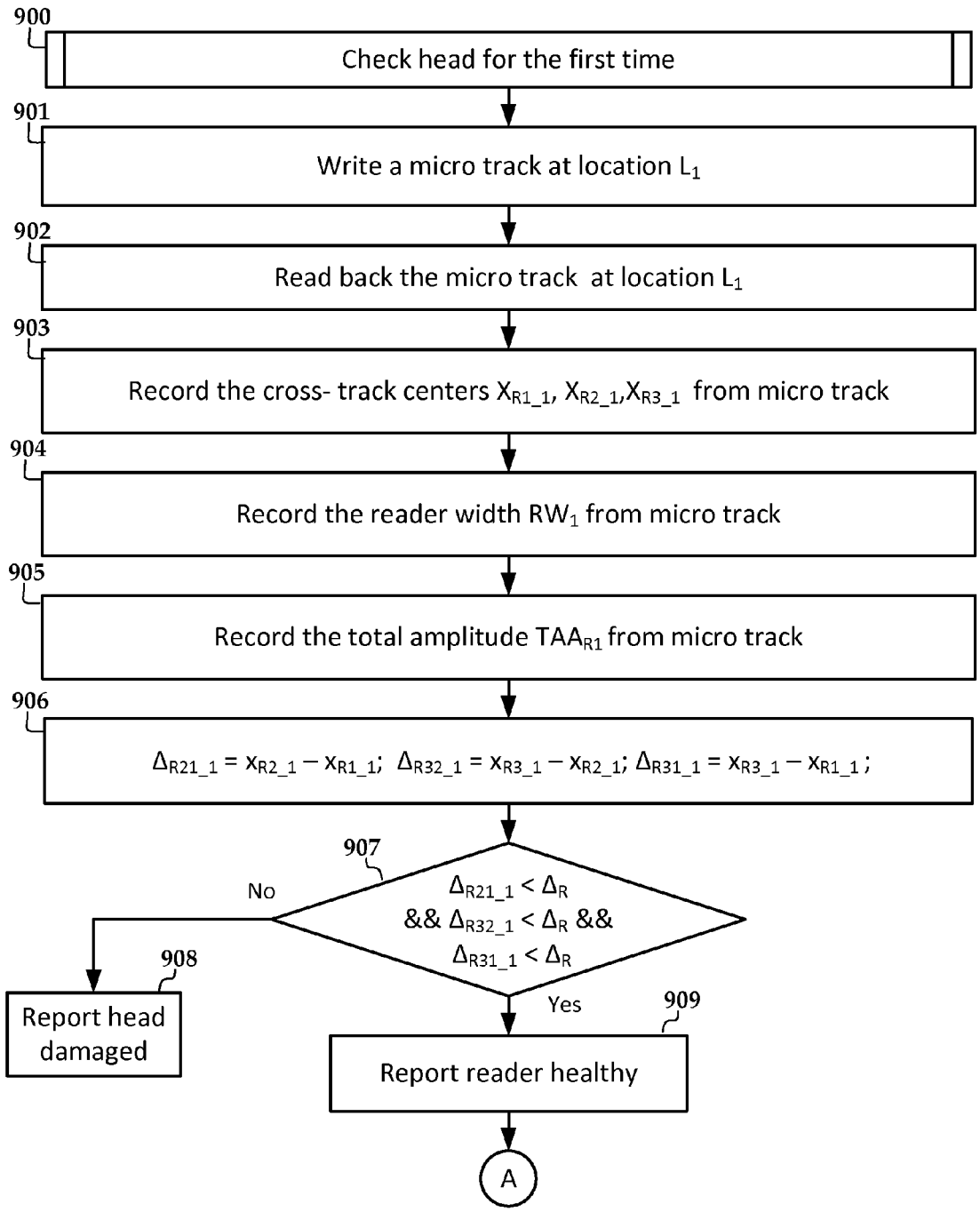
FIGS. 9A-9D are flowcharts of a test procedure according to an example embodiment.

In FIGS. 9A-9D, a flowchart illustrates a procedure according to another example embodiment. The procedure begins as shown in FIG. 9A, by checking 900 head health for the first time. The check 900 may performed in the drive assembly during factory testing, for example. A micro track is written 901 (e.g., as described in the procedure shown in FIG. 3A) at a location $L_1$. The microtrack is read 902 using a cross-track scan of amplitude. Based on the scan, center locations of the microtrack are recorded 903, initial reader width is recorded 904, and initial total reader amplitude is recorded 905. All of the recorded values are stored in non-volatile memory for use during operation of the drive. Center offsets for the reader are computed 906 and compared 907 against maximum deltas. If one of the offsets is greater than the delta, the head is reported 908 as damaged. Otherwise, the reader is reported 909 as healthy, and the procedure continues to FIG. 9B.

Figure 9B:
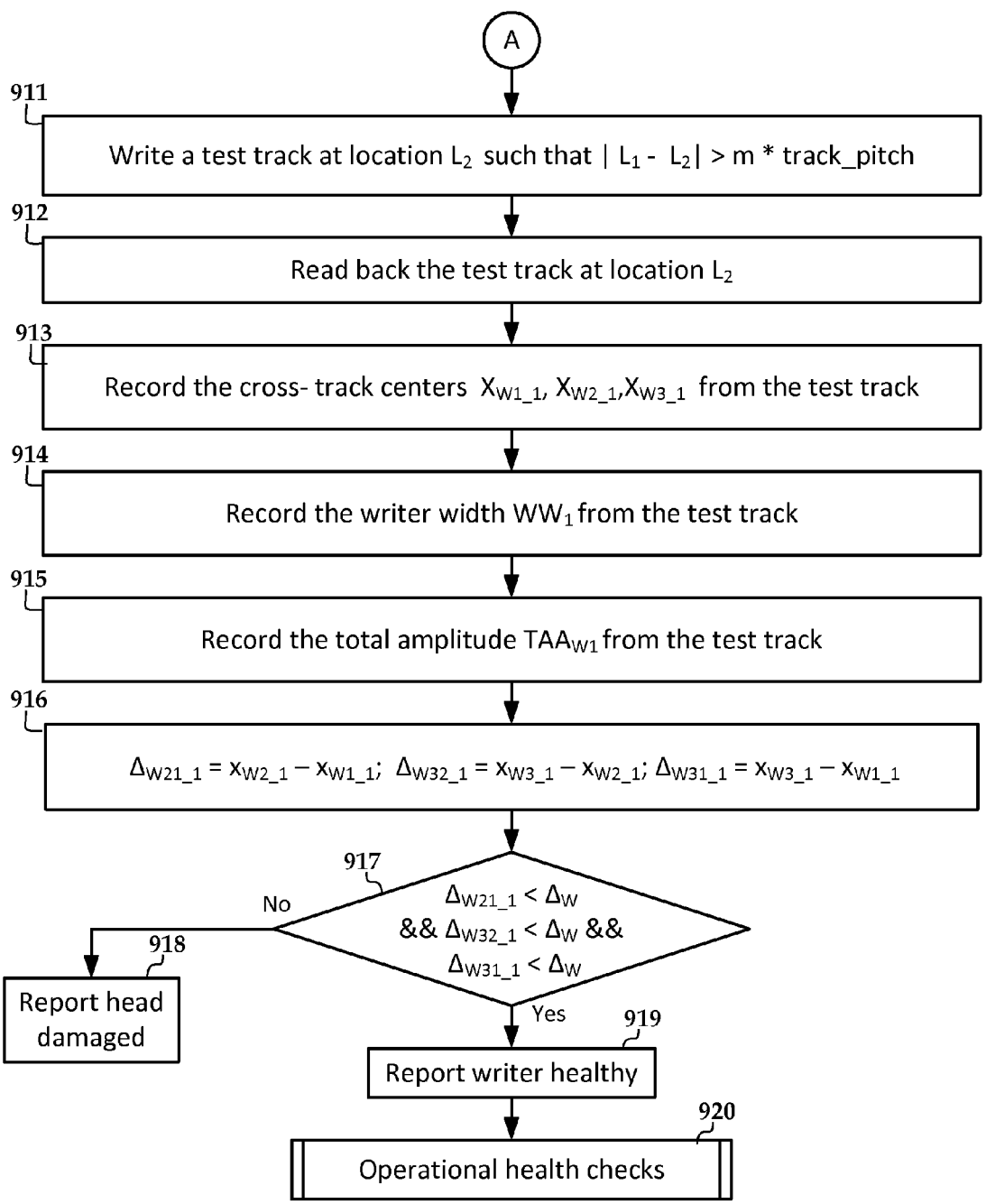

In FIG. 9B, a test track is written 911 (e.g., as described in the procedure shown in FIG. 4A) at a location $L_2$. The locations $L_1$ (where the microtrack was written) and $L_2$ are separated by m*track pitch, where m is user-defined. The test track is read 912 using a cross-track scan of amplitude. Based on the scan, center locations of the test track are recorded 913, initial reader width is recorded 914, and initial total writer amplitude is recorded 915. All of the recorded values are stored in non-volatile memory for use during operation of the drive. Center offsets for the writer are computed 916 and compared 917 against maximum deltas. If one of the offsets is greater than the delta, the head is reported 918 as damaged. Otherwise, the writer is reported 919 as healthy. This concludes the initial health check, and thereafter operational health checks 920 will be repeatedly performed.

Figure 9C:
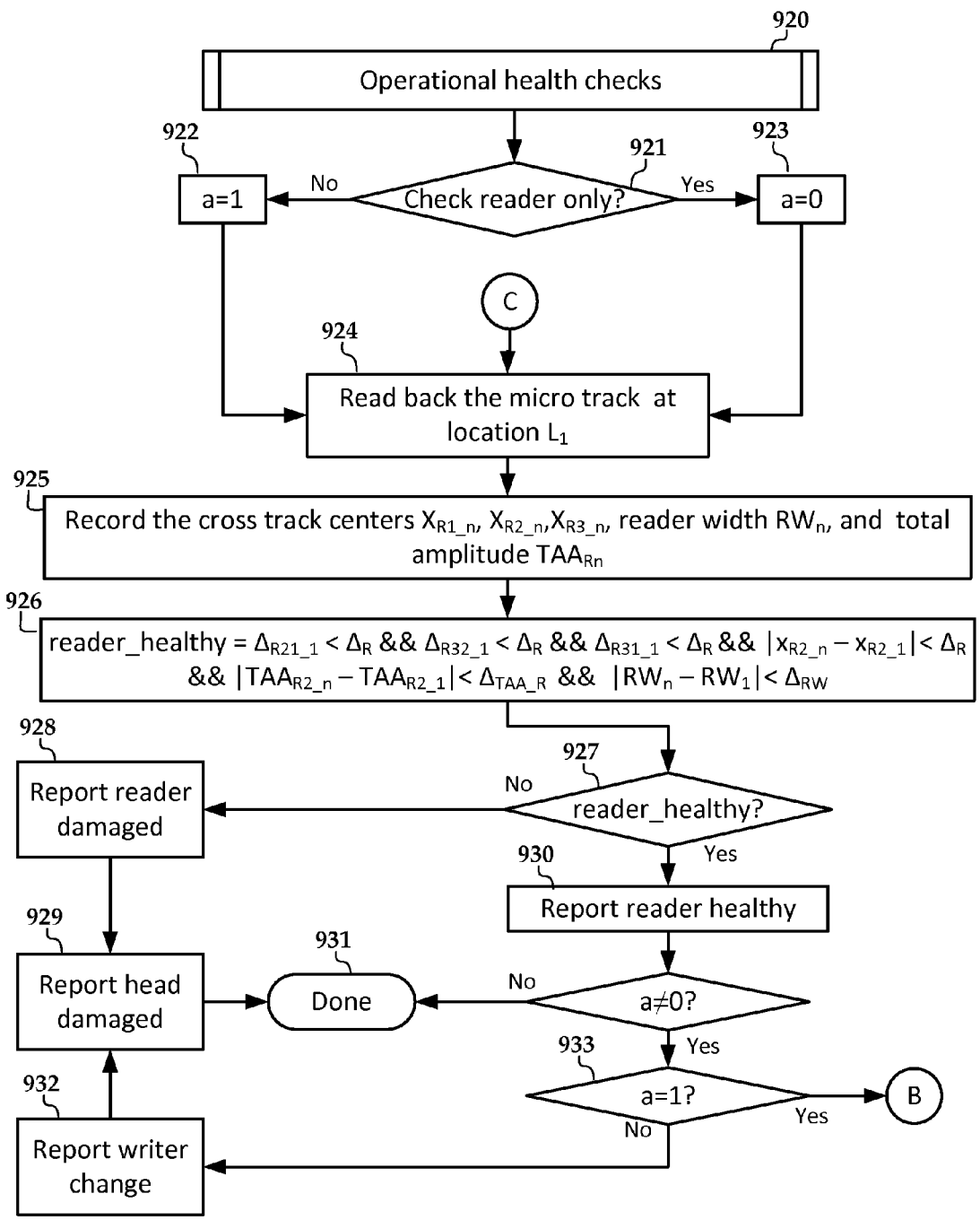

As seen in FIG. 9C, the operational health check 920 for the $n^{th}$ iteration may be reader-only or for both reader and writer, as determined at block 921. This determination 921 results in a local variable being set 922, 923 appropriately, a=1 or a=0, respectively. The originally written microtrack (from block 901 in FIG. 9A) is read 924 to determine a cross-track profile. The centers, reader width, and total amplitude are recorded 925 based on the profile. A Boolean value is determined 926 based on the recorded values, and this value is checked 927 to determine reader health. If the check 927 returns "no," the reader is reported 928 as damaged, and head is reported 929 damaged as well.

Figure 9D:
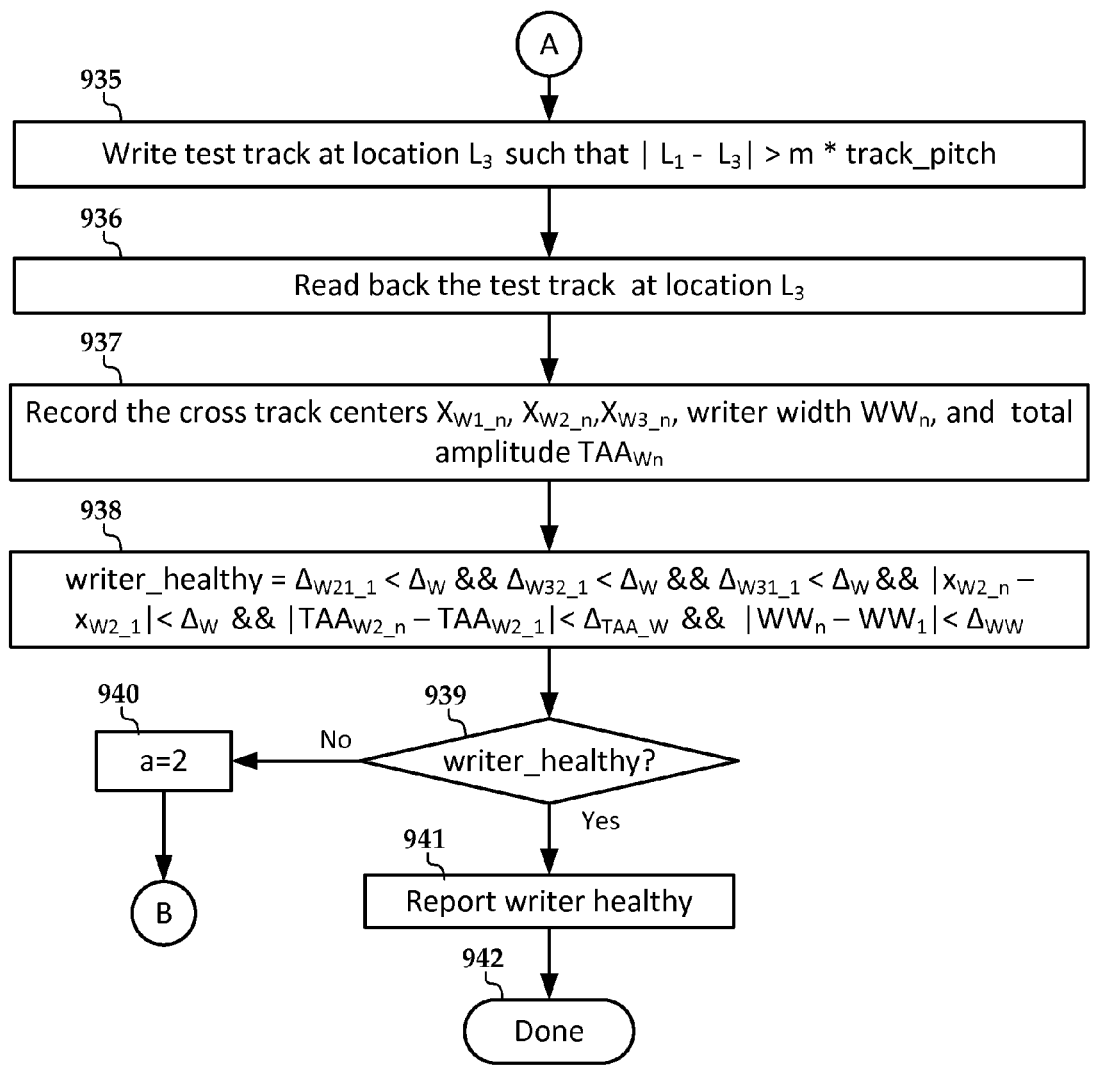

If the check 927 returns "yes," the reader is reported 930 as healthy. If only the reader is to be checked (a=0), the procedure completes 931. If the writer is to be checked and the reader has only been checked once (a=1), then the procedure continues to FIG. 9D. In FIG. 9D, a test track is written 935 at location $L_3$ (which may be the same as or different than location $L_2$ where the track at block 911 in FIG. 9B was written). The test track is read 936 to determine a cross-track profile. The centers, writer width, and total amplitude are recorded 937 based on the profile. A Boolean value is determined 938 based on the recorded values, and this value is checked 939 to determine writer health. If the check 939 returns "yes," the writer is reported 941 as healthy and the check is completed 942 for this iteration.

If the check 939 returns "no," the temporary variable is set 940 to a=2, and the block 924 in FIG. 9C is re-entered to initiate another reader check. The reader might have been damaged during writer health check, and so checking the reader again could rule out the effect of a bad writer track profile due to reader damage. If the reader again is judged healthy at block 927 of FIG. 9C, then block 933 will return false because of the failed writer check. This results in a writer change being reported 932, and head reported damaged 929.

It will be understood that some of the measurements or calculations made in FIGS. 9A-D may be optional. For example, some criteria such as total amplitude or writer width may not be used to determine reader and/or writer health, such as described in relation to FIGS. 3A-3D and 4A-4B. In other cases, instead of a Boolean pass/fail criteria, the measured values may be combined (e.g., weighted sum) into a score, and this score may be tested against a threshold to determine pass/fail criteria. In some cases, if a reader or writer fails a certain criteria, mitigation action may be attempted before declaring a damaged reader or writer.

Figure 10:
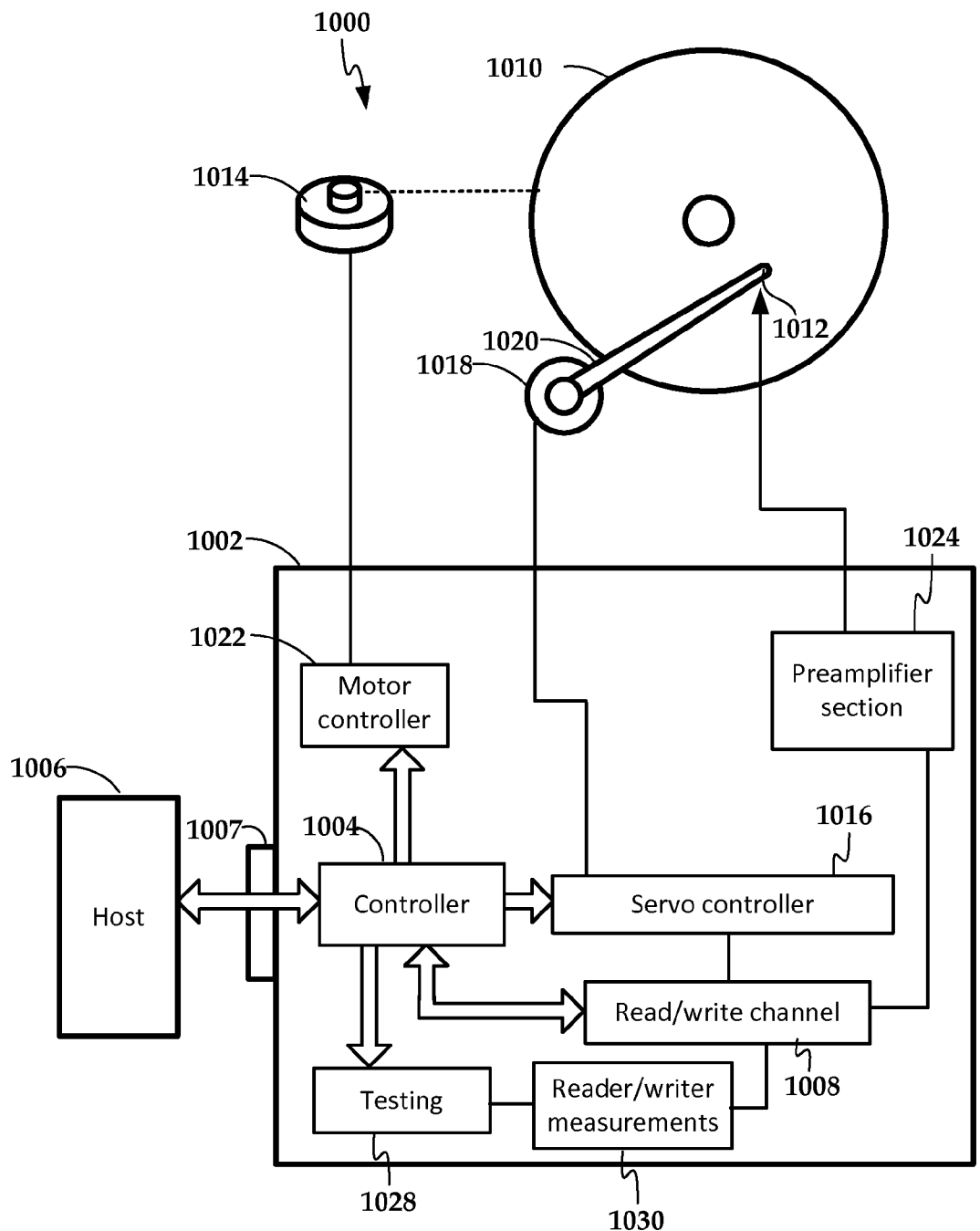
FIG. 10 is a block diagram of an apparatus according to an example embodiment.

In reference now to FIG. 10, a block diagram illustrates components of system 1000 according to an example embodiment. The system 1000 may be part of a test stand or include a fully-assembled hard drive. The system 1000 includes circuitry 1002 coupled to one or more read/write heads 1012 that may ultimately be used in a hard drive. The circuitry 1002 includes a controller 1004 that controls a number of functions of the system 1000, optionally including communications between the circuitry 1002 and a host device 1006 via a host interface 1007. The host device 1006 may include any electronic device that can be communicatively coupled to communicate with the circuitry 1002, e.g., a general-purpose computer, a factory test bench, remote terminal, etc.

The controller 1004 may include any combination of custom logic circuits, application specific integrated circuits (ASICs), general-purpose central processing unit (CPU), interface circuits, and may utilize instructions stored as firmware and/or software. The controller 1004 may read data from and write data to a recording medium (e.g., disk 1010) via a read/write channel 1008. The controller 1004 may, among other things, determine a location on the disk 1010 for the desired data, move the heads to the location (track) of the data, read or write the data via the read/write channel 1008, correct errors, transfer the data to/from the host 1006, etc.

The read/write channel 1008 converts data between the digital signals processed by the data controller 1004 and the analog signals conducted through read/write heads 1012. The read/write channel 1008 also provides servo data read from the disk 1010 to a servo controller 1016. The servo controller 1016 uses these signals to drive an actuator 1018 (e.g., voice coil motor) that rotates an arm 1020, upon which the read/write heads 1012 are mounted. The heads 1012 are moved radially across different tracks of the disk(s) 1010 by the actuator motor 1018 (e.g., voice coil motor), while a spindle motor 1014 rotates the disk(s) 1010. A microactuator (not shown) may also be included to provide finer tracking control, and also receives inputs from the servo controller 1016. The controller 1004 controls the spindle motor 1014 by way of a motor controller 1022.

During write operations, the read/write channel 1008 provides analog signals that are delivered to the read/write heads 1012 by way of a preamplifier section 1024. The preamplifier section 1024 amplifies and conditions the write signals sent to write coils of the read/write heads 1012. In the illustrated embodiment, the preamplifier section 1024 also includes circuitry that energizes a laser (or other energy source) at each of the read/write heads 1012 during write operations. The laser preamplifier provides signals that activate the lasers to heat a spot on the disk 1010 as it is being recorded.

The preamplifier section 1024 may also include circuitry that processes signals generated at the read/write heads 1012. For example, the preamplifier section 1024 may include a variable gain amplifier (VGA) that receives data signals from one or more of the read/write heads 1012 during read operations. The VGA provides a variable amount of gain so that the signal has sufficient amplitude without saturation for use by the read/write channel 1008. The amount of gain provided by the VGA is inversely proportional to the amplitude of the track, and can be used to perform the check procedures described above.

A testing module 1028 is operable by the controller to perform testing operations, e.g., during a design, manufacturing, and/or operational phase of a hard disk. As indicated by reader/writer measurement module 1030, the testing module 1028 is used to measure a cross-track signal profile of one or more tracks (e.g., microtrack or writer test tracks) written to the disk 1010. The cross track profile may be obtained via the VGA, read/write channel 1008, or other hardware not shown such as an oscilloscope. This testing may at least be used to determine track centers at various amplitudes, and qualify the read/write heads 1012.

In one example of the testing, the servo controller 1016 and read/write channel 1008 are commanded to record a signal to at least part of a track on the disk(s) 1010 using each of the read/write heads 1012. These track portions may include a known pattern of data to facilitate more easily decoding the data later on. The servo controller 1016 then reads back the parts of the tracks using multiple passes, while offsetting (via the servo controller 1016) the respective read/write head 1012 different amounts relative to the track centerline for each of the passes. For each of the passes, a measured value of amplitude as a function of servo offset may be recorded by the measurement module 1030 to obtain a cross track amplitude profile. The amplitude values may be determined using any combination of the amount of gain used by the VGA to read the data, harmonic sensor output, signal-to-noise ratio of the signal, and bit error rate seen by the read write channel. The harmonic sensor is a narrow-band filter that measures amplitude for specific programmed frequency. The harmonic sensor is provided by the read channel, and may use programmable values of frequency for measuring amplitude.

This measurement and recording of the amplitude profiles may be repeated for each of the read/write heads 1012, and may be performed at multiple zones spread across the disk(s) 1010. The measured profiles may be analyzed as described above (e.g., amplitude-specific centers compared) and used to qualify the read/write head 1012. This qualification may involve grading and/or rejecting a read/write head 1012 during factory test, and may also be used in fielded hard drive assemblies, e.g., to diagnose performance issues, perform mediation, etc. Data recorded from the measurements may be stored in persistent storage, e.g., on the disk 1010 or flash memory (not shown) and be used as baseline values as described above, e.g., baseline track center locations, baseline track width, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   reading a cross-track profile of a known good test track on a recording medium during operation of a data storage device that comprises the recording medium;
   determining two or more center locations of the test track at two or more different amplitude levels via a read transducer; and
   determining a health condition of the read transducer by comparing the two or more center locations of the test track with one another.

2. The method of claim 1, further comprising, if the health condition of the read transducer satisfies a threshold:
   writing a new test track via a write transducer associated with the read transducer;
   determining two or more center locations of the new track at the two or more different amplitude levels via the read transducer; and
   determining a health condition of the write transducer by comparing the two or more center locations of the new track with one another.

3. The method of claim 2, wherein determining the health condition of the write transducer comprises comparing a width of the new test track with a baseline width associated with the write transducer.

4. The method of claim 2, wherein determining the health condition of the write transducer comprises determining an offset of the two or more center locations compared to a baseline center associated with the write transducer.

5. The method of claim 2, wherein the new test track is written at least ten times of a track pitch away from the known good test track.

6. The method of claim 1, wherein determining the health condition of the read transducer further comprises comparing at least one of the center locations of the test track with an initially measured center location of the test track.

7. The method of claim 1, wherein determining the health condition of the read transducer further comprises at least one of:
   comparing a width of the test track with an initially measured width of the test track; and
   comparing a total amplitude of the test track with an initially measured total amplitude of the test track.

8. The method of claim 1, wherein the known good track comprises a microtrack.

9. The method of claim 1, wherein the two or more different amplitude levels comprise 10%, 50%, and 90% of a maximum amplitude of the test track.

10. A method comprising:
    during operation of a data storage device that comprises a recording medium, determining a health condition of a read transducer that reads from the recording medium; and
    in response to the health condition of the read transducer satisfying a threshold:
       writing a new test track on the recording medium via a write transducer associated with the read transducer;
       determining two or more center locations of the new track at two or more different amplitude levels via the read transducer; and
       determining a health condition of the write transducer by comparing the two or more center locations of the new track with one another.

11. The method of claim 10, wherein determining the health condition of the write transducer comprises comparing a width of the new test track with a baseline width associated with the write transducer.

12. The method of claim 10, wherein determining the health condition of the write transducer comprises determining an offset of the two or more center locations compared to a baseline center associated with the write transducer.

13. The method of claim 10, wherein determining the health condition of the read transducer comprises:
    reading a cross-track profile of a known good test track on the recording medium;
    determining two or more center locations of the test track at two or more different amplitude levels via a read transducer; and
    determining a health condition of the read transducer by comparing the two or more center locations of the test track with one another.

14. A data storage device, comprising:
    a preamplifier section configured to communicated with a read transducer and write transducer of a read/write head that reads from and writes to a recording medium;
    a controller coupled to the preamplifier section and configured to:
       read a cross-track profile of a known good test track on the recording medium during operation of the data storage device;
       determine two or more center locations of the test track at two or more different amplitude levels via the read transducer; and
       determine a health condition of the read transducer by comparing the two or more center locations of the test track with one another.

15. The data storage device of claim 14, wherein the controller is further configured to, if the health condition of the read transducer satisfies a threshold:
    write a new test track via the write transducer;
    determining two or more center locations of the new track at the two or more different amplitude levels via the read transducer; and
    determining a health condition of the write transducer by comparing the two or more center locations of the new track with one another.

16. The data storage device of claim 15, wherein determining the health condition of the write transducer comprises comparing a width of the new test track with a baseline width associated with the write transducer.

17. The data storage device of claim 15, wherein determining the health condition of the write transducer comprises determining an offset of the two or more center locations compared to a baseline center associated with the write transducer.

18. The data storage device of claim 14, wherein the known good track comprises a microtrack.

19. The data storage device of claim 14, wherein determining the health condition of the read transducer further comprises comparing at least one of the center locations of the test track with an initially measured center location of the test track.

20. The data storage device of claim 14, wherein determining the health condition of the read transducer further comprises at least one of:
   comparing a width of the test track with an initially measured width of the test track; and
   comparing a total amplitude of the test track with an initially measured total amplitude of the test track.

* * * * *